(No Model.)

C. G. WEST.
CAR WHEEL.

No. 431,635. Patented July 8, 1890.

Witnesses.
A. Ruppert,
G. B. Fowler

Inventor.
Charles G. West
Per
Thomas P. Simpson
Atty

UNITED STATES PATENT OFFICE.

CHARLES GILBERT WEST, OF NORTH STAR, MICHIGAN.

CAR-WHEEL.

SPECIFICATION forming part of Letters Patent No. 431,635, dated July 8, 1890.

Application filed March 27, 1890. Serial No. 345,586. (No model.)

*To all whom it may concern:*

Be it known that I, CHARLES GILBERT WEST, a citizen of the United States, residing at North Star, in the county of Gratiot and State of Michigan, have invented certain new and useful Improvements in Car-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make car-wheels so that cars may run with little danger over spread or badly-jointed tracks, while "jumping the track" may be attended with very little danger.

Figure 1:
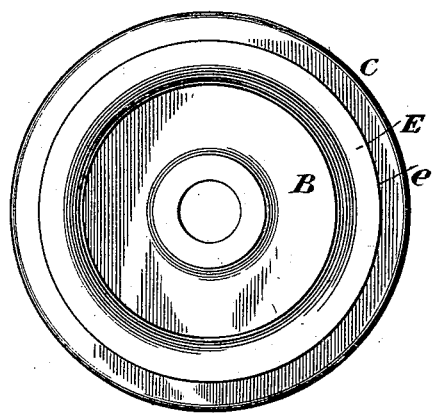
Figure 2:
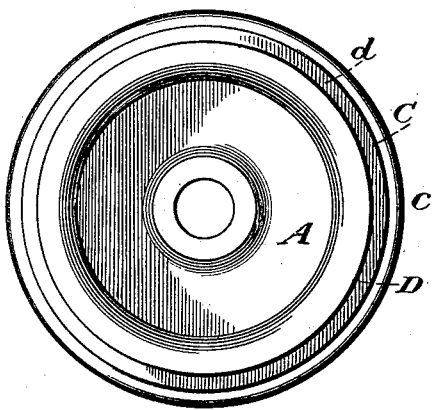
Figure 3:
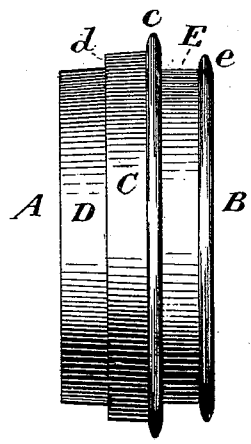
Figure 4:
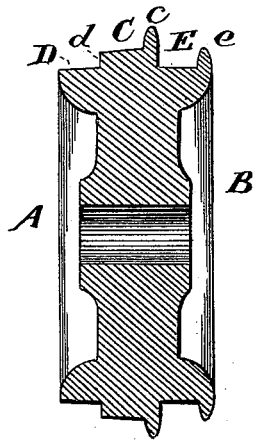

Figure 1 of the drawings is an elevation showing the inside of my car-wheel; Fig. 2, an elevation showing the outside of the wheel; Fig. 3, a front elevation, and Fig. 4 a diametrical cross-section.

In the drawings, A represents the outer side of the wheel, B the inner side, and C the ordinary or central tread with the usual flange $c$. I make two idler-treads D E, one on each side of the tread C and of less diameter. The outside tread D has the side $d$ of the tread C for its flange, while I provide the inside tread E with the flange $e$. When the wheel jumps the track and catches on the latter with the treads D E, the flanges $d$ $e$ perform the same function as the flange $c$, which is to press against the side of rail. The flange $c$ is about one inch high and one and a half inch smaller in diameter than the tread C, so that the flange on E will ordinarily stand three-fourths of an inch above the rail, and thus clear crossing-plank guards and railroad-crossings. My wheel may be used on any known rail-car axle, the central tread C being gaged to the track, while the outside tread D on one side and the inside tread E on the other of a pair of wheels act together on the opposite rails at the same time when the track has been jumped. The hub of my wheel is made like those in general use, but may be made in any approved manner, as my invention relates only to the treads.

It is a well-ascertained fact that thousands of lives and large values in property are yearly sacrificed by the jumping of the tracks by cars of all kinds. By the use of my wheel much the greater number of these accidents may be rendered harmless, as the car will be caught by the idler-treads D E, which will catch the rails, and, as this will at once be noticed, the train will be stopped and returned to central tread C by means of the ordinary frogs, with which every train is provided. This wheel will run safely on a rail which is spread five or six inches out of its proper position, the wheels dropping so as to run on the idler-treads D E.

I am aware that a car-wheel has been made with plural treads, but all on circles of the same diameter. These proved impracticable, because they would not clear the plank guard-rails or railroad-crossings.

I am also aware that a car-wheel has been made with an extra outside tread and a grab-flange on its outer edge; but when the locomotive or one of the cars jumped the track all the wheels on one side were off the track and held against the outside of track by the outside grab-flange of the wheels upon the opposite track. These wheels were relinquished as impracticable more than fifteen years ago. I have now overcome the objections which existed to them by making both an outside and an inside tread of less diameter than the middle or main tread and making a grab-flange $e$ on the inside tread but none on the outside one. By my construction of car-wheel none leave either track, but run on the extra treads until the train is stopped and the wheel caused to take the track with their main treads.

What I claim as new, and desire to protect by Letters Patent, is—

A car-wheel having three treads D C E, the side treads D E being made of less diameter than the middle tread C, and an edge flange being formed on the inner tread E, but none on the outer tread D, as shown and described.

In testimony whereof I affix my signature in presence of two witnesses.

CHARLES GILBERT WEST.

Witnesses:
A. H. PHINNEY,
M. F. CHAFEY.